United States Patent Office 3,444,159
Patented May 13, 1969

---

3,444,159
5-(γ-DIMETHYLAMINO-n-BUTYL) IMINOSTIL-BENE AND SALTS THEREOF
Charles Gansser, Essonne, France, and Walter Schindler, Riehen, Switzerland, assignors to Geigy Chemical Corporation, Ardsley, N.Y., a corporation of New York
No Drawing. Continuation-in-part of application Ser. No. 235,177, Oct. 30, 1962. This application June 19, 1967, Ser. No. 647,178
Claims priority, application Switzerland, Aug. 28, 1959, 77,491/59; Jan. 13, 1960, 299/60; Feb. 25, 1960, 2,108/60
Int. Cl. C07d 57/36; A61k 9/04, 27/00
U.S. Cl. 260—239                                3 Claims

ABSTRACT OF THE DISCLOSURE

The compound of the formula

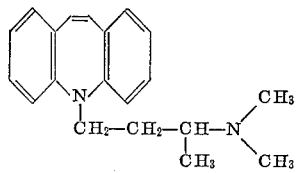

and pharmaceutically acceptable salts thereof with inorganic and organic acids, which compounds have strong spasmolytic and especially musculotropic action rendering them useful in the treatment of psychosomatic disturbances, especially spastic conditions of smooth muscle structures of the gastro-intestinal, urogenital and biliary tracts and/or the bronchial system; spasmolytic compositions containing the aforesaid compounds; and a method for the treatment of spastic conditions of smooth muscle structures in mammals with the aid of the aforesaid compounds.

---

This application is a continuation-in-part of our copending application Ser. No. 235,177, filed Oct. 30, 1962 as a continuation-in-part of our application Ser. No. 52,044, filed Aug. 26, 1960, both now abandoned.

The present invention concerns new N-heterocyclic compounds having valuable pharmacological properties.

Compounds having the general formulae

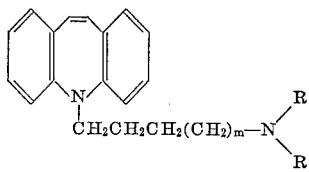

and

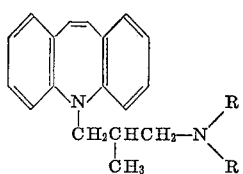

wherein R is lower alkyl, and $m$ is zero or one, are primarily distinguished by sizeable reserpine-antagonistic activity which is generally correlated with antidepressant activity. These compounds are, therefore, valuable in the treatment of mental disorders, particularly depressions. However, these compounds do not possess significant spasmolytic and especially musculotropic activity, whereas such activity is desirable in the treatment of certain types of mental depression, which do not involve a central component of agitation; for antidepressants of the aforesaid type commonly cause an aggravation of agitation even though the depressed state is ameliorated.

It has now been found that the compound of the Formula I, below, and its pharmaceutically acceptable addition salts with acids,

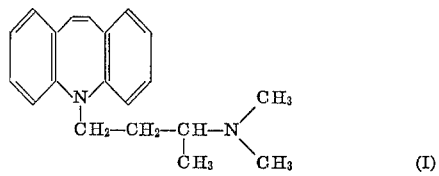

are distinguished from the above-mentioned prior art compounds and from 5-(γ-diethylamino-n-butyl)-iminostilbene by strong spasmolytic and especially musculotropic action which makes this compound particularly useful in the treatment of psychosomatic disturbances, i.e. disturbances which noticeably affect the mental as well as the somatic domain simultaneously, and wherein the mental affliction is a depressed state largely free from a central component of agitation, while the somatic afflictions are especially spastic conditions of smooth-muscle structures of the gastro-intestinal, urogenital and biliary tracts, and/or of the bronchial system.

The compound of the above Formula I is produced by reacting iminostilbene of the formula

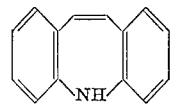

in the presence of an acid binding agent with a reactive ester of the basic alcohol of the formula

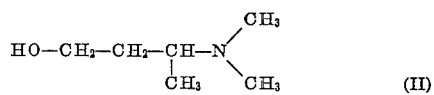

Particularly suitable condensing agents are sodium amide, lithium amide, potassium amide, sodium or potassium, butyl lithium, phenyl lithium, sodium hydride or lithium hydride. The reaction can be performed in the presence or absence of an inert organic solvent, examples of which are benzene, toluene and xylene.

As reactive esters of the aforesaid basic alcohol, in particular the halides, aryl sulphonic acid esters and methane sulphonic acid esters are used. Examples thereof are γ-dimethylamino-n-butyl chloride and the corresponding bromide and γ-toluene sulfonic acid ester. These reactive esters of the basic alcohol are obtained, for example, starting from 1,3-butylene glycol by reacting it with acetyl chloride to form 3-chloro-n-butyl acetate, reacting the latter with dimethylamine and converting the resulting 3-dimethyl-amino-n-butanol obtained into its chloride, bromide or toluene sulfonic acid ester.

The compound of Formula I forms pharmaceutically acceptable addition salts, some of which are water-soluble, with inorganic or organic acids such as hydrochloric acid, hydrobromic acid, sulfuric acid, phosphoric acid, methane sulfonic acid, ethane disulfonic acid, acetic acid, citric acid, malic acid, succinic acid, maleic acid, fumaric acid, tartaric acid, benzoic acid, phthalic acid and 8-chlorotheophyllin.

The following non-limitative example further illustrates the production of the new compound according to the invention. Where not otherwise stated, parts are given as parts by weight and their relationship to parts by volume is as that of grams to cubic centimeters. The temperatures are in degrees centigrade.

EXAMPLE 1

18.3 parts of iminostilbene are dissolved in 490 parts of anhydrous benzene and 18 parts of γ-dimethylamino-n-butyl chloride in 150 parts by volume of anhydrous benzene are added.

A suspension of 4 parts of sodium amide in toluene is added dropwise at 55° while stirring well and the whole is then refluxed for 15 hours. Water is then added to the reaction mixture and the basic portions are removed from the benzene phase by extracting three times with diluted hydrochloric acid. The combined extracts are made alkaline and extracted with ether. The ethereal solution is dried over potassium carbonate and concentrated. The residue is distilled in a high vacuum whereupon the 5-(γ-dimethylamino-n-butyl) iminostilbene passes over at 172–176° and 0.025 mm. pressure.

The hydrochloride is prepared with alcoholic hydrochloric acid in a conventional manner.

To product dosage units for peroral application, the above-mentioned active compound or the salts thereof are combined, e.g. with solid, pulverulent carriers such as talcum, lactose, saccharose, sorbitol, mannite; starches such as potato starch, corn starch or amylopectin; cellulose derivatives or gelatin, possibly with the addition of lubricants such as magnesium or calcium stearate or polyethylene oxides of suitable molecular weights (Carbowax) and disintegrating agents such as, e.g. alginic acid, laminaria powder or citrus pulp powder, to form tablets or dragée cores. The latter are coated, for example, with concentrated sugar solutions which can contain for example, shellac, gum arabic, talcum and/or titanium dioxide, or with Carbowax with the addition of talcum or titanium dioxide. Dyestuffs are added to the dragées, e.g. to distinguish between the different dosages. Soft gelatine capsules (pearl-shaped closed capsules) and other closed capsules consist, for example, of gelatine and contain, e.g. mixtures of the active ingredient or its suitable salt with Carbowax, and hard gelatine capsules contain, e.g. granulates of the active substance or its suitable salt with gelatine, magnesium stearate or stearic acid. Suppositories are an example of dosage units for rectal application. They consist of a combination of the active substance or of a suitable salt with a neutral fatty base.

Ampoules for parenteral, particularly intramuscular application preferably contain a water soluble salt of the active substance according to the invention and suitable stabilizing agents and, optionally, buffer substances in aqueous solution. Antioxidising agents such as sodium bisulphite, sodium sulphite, ascorbic acid or rongalite, formaldehyde-sodium bisulphite compound) are suitable in particular as stabilising agents either alone or combined, in total concentrations between about 0.1–0.5 per mille. Because of its ability to form chelates, ascorbic acid has an additional stabilising effect; in this function it can also be replaced by other chelate-formers. The best stability of the active ingredient is attained if the pH of the ampoule solutions is between 3.5 and 5. This range can be attained, e.g. by mixtures in suitable ratio of sodium sulphite, sodium bisulphite and/or ascorbic acid, or by the addition of other buffer substances such as citric acid and/or salts thereof. In addition, the ampoules can contain a slight amount of a usual conserving agent.

The following examples illustrate the production of two typical forms of application for oral and one for parenteral use, but the invention is in no way limited thereto.

EXAMPLE 2

250 g. of 5-(γ-dimethylamino-n-butyl)-iminostilbene hydrochloride are mixed with 175.80 g. of lactose and 169.70 parts of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance (hydrochloride). The tablets can be marked with break lines if desired to enable a closer adaption of the dosage to be made.

EXAMPLE 3

A granulate is prepared from 250 g. of 5-(γ-dimethylamino-n-butyl)-iminostilbene hydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and pressed into 10,000 dragée centres. These are then coated with a concentrated syrup of 502.28 g. of crystallised saccharose, 6 g. of shellac, 10 g. of gum arabic, 0.22 g. of dye-stuff and 1.5 g. of titanium dioxide and dried. The dragées obtained each weigh 120 mg. and contain 25 mg. of active substance.

EXAMPLE 4

1.25 g. of 5-(γ-dimethylamino-n-butyl)-iminostilbene hydrochloride, 0.10 g. of ascorbic acid, 0.05 g. of sodium bisulphite and 0.10 g. of sodium sulphite are dissolved in distilled water until the volume is 100 ml. This solution is used to fill ampoules, each of preferably 2 ml. and containing 25 mg. of active substance. The ampoules are heat-sterilized in the usual way.

We claim:
1. The compound of the formula

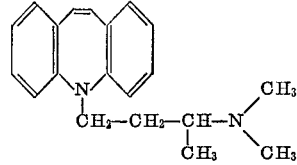

2. A pharmaceutically acceptable addition salt of the compound defined in claim 1 with an acid.

3. The hydrochloride of the compound defined in claim 1.

References Cited

UNITED STATES PATENTS 3,074,931   1/1963   Craig _____ 260—239

ALTON D. ROLLINS, Primary Examiner.

U.S. Cl. X.R.

260—253; 424—34, 37, 175, 244, 253